(12) United States Patent
Zhang et al.

(10) Patent No.: US 8,797,835 B1
(45) Date of Patent: Aug. 5, 2014

(54) METHOD AND APPARATUS FOR DETECTING CROSSTALK BETWEEN A PLURALITY OF DEVICES COMMUNICATING IN ACCORDANCE WITH A UNIVERSAL SERIAL BUS (USB) PROTOCOL

(75) Inventors: Zhenyu Zhang, San Jose, CA (US); Dongxin Zhou, Shanghai (CN); Baolei Xie, Shanghai (CN); Shaori Guo, San Jose, CA (US); Jeanne Q. Cai, Fremont, CA (US); Eric Hung, Dublin, CA (US)

(73) Assignee: Marvell International Ltd., Hamilton (BM)

( * ) Notice: Subject to any disclaimer, the term of this patent is extended or adjusted under 35 U.S.C. 154(b) by 105 days.

(21) Appl. No.: 13/593,875

(22) Filed: Aug. 24, 2012

Related U.S. Application Data (60) Provisional application No. 61/527,919, filed on Aug. 26, 2011, provisional application No. 61/527,923, filed on Aug. 26, 2011.

(51) Int. Cl.
| | | |
|---|---|---|
| *H04J 1/12* | (2006.01) | |
| *H04B 3/46* | (2006.01) | |
| *H04B 3/32* | (2006.01) | |
| *H04M 3/34* | (2006.01) | |
| *H04L 5/14* | (2006.01) | |

(52) U.S. Cl.
CPC *H04B 3/464* (2013.01); *H04B 3/32* (2013.01); *H04M 3/34* (2013.01); *H04L 5/1461* (2013.01)
USPC .......................................... 370/201

(58) Field of Classification Search
CPC .......... H04B 3/464; H04B 3/32; H04M 3/34; H04M 3/30; H04L 5/1461
USPC .......................................... 370/201
See application file for complete search history.

(56) References Cited

U.S. PATENT DOCUMENTS

| | | | | |
|---|---|---|---|---|
| 4,610,010 | A  * | 9/1986 | Claessen et al. | 370/282 |
| 6,339,613 | B2 * | 1/2002 | Terry | 375/227 |
| 7,142,501 | B1 * | 11/2006 | Barrass et al. | 370/201 |
| 7,778,332 | B2 * | 8/2010 | Shi | 375/257 |
| 8,243,578 | B2 * | 8/2012 | Kramer et al. | 370/201 |
| 8,576,690 | B2 * | 11/2013 | Pierrugues et al. | 370/201 |
| 2003/0137925 | A1 * | 7/2003 | Zamir | 370/201 |
| 2008/0310330 | A1 * | 12/2008 | Agazzi et al. | 370/286 |
| 2010/0208785 | A1 * | 8/2010 | Lindqvist et al. | 375/227 |

* cited by examiner

*Primary Examiner* — Min Jung (57) ABSTRACT

A first device comprising a transceiver module configured to begin transmission of a first signal to a second device. A control module is configured to, in response to the transceiver module receiving a second signal during the transmission of the first signal to the second device, determine whether the second signal corresponds to crosstalk by having the transceiver module suspend the transmission of the first signal. In response to the transceiver module continuing to receive the second signal subsequent to the transceiver module having suspended the transmission of the first signal to the second device, the control module determines that the second signal does not correspond to crosstalk. In response to the transceiver module not continuing to receive the second signal subsequent to the transceiver module having suspended the transmission of the first signal to the second device, the control module determines that the second signal does correspond to crosstalk.

17 Claims, 4 Drawing Sheets

METHOD AND APPARATUS FOR DETECTING CROSSTALK BETWEEN A PLURALITY OF DEVICES COMMUNICATING IN ACCORDANCE WITH A UNIVERSAL SERIAL BUS (USB) PROTOCOL

CROSS-REFERENCE TO RELATED APPLICATIONS

This application claims the benefit of U.S. Provisional Application Nos. 61/527,919 and 61/527,923, filed on Aug. 26, 2011. The disclosures of the above applications are incorporated herein by reference in their entirety.

FIELD

The present disclosure relates to universal serial bus (USB) communication, and more particularly to detecting and managing crosstalk in USB communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many devices communicate with one another using universal serial bus (USB) protocol (i.e., communicate over a USB connection). For example, a host may communicate with a device (e.g., a link partner) over a USB connection. The host may be a device including, but not limited to, a desktop computer, laptop, set top box, smartphone or other mobile device, or any other suitable host device. The device may be a device including, but not limited to, a camera, printer, solid state drive, or any other suitable peripheral or mobile device.

Some devices and/or USB connections may be configured according to USB 3.0, which corresponds to a third revision of USB protocol. For example only, USB 3.0 includes Super Speed (SS) transfer capability, separate unidirectional transmit and receive data paths, and other improvements.

SUMMARY

A first device includes a transceiver module configured to begin transmission of a first signal, over a communication link, to a second device. A control module is configured to, in response to the transceiver module receiving a second signal over the communication link during the transmission of the first signal to the second device, determine whether the second signal corresponds to crosstalk by having the transceiver module suspend the transmission of the first signal to the second device. In response to the transceiver module continuing to receive the second signal subsequent to the transceiver module having suspended the transmission of the first signal to the second device, the control module determines that the second signal does not correspond to crosstalk. In response to the transceiver module not continuing to receive the second signal subsequent to the transceiver module having suspended the transmission of the first signal to the second device, the control module determines that the second signal does correspond to crosstalk.

In other features, a first device includes a transceiver module configured to receive a first signal and a second signal transmitted from a second device to the first device, wherein the first signal corresponds to a wakeup signal and the second signal corresponds to a first training sequence, transmit a third signal from the first device in response to the first signal, wherein the third signal corresponds to a reply to the wakeup signal, and transmit a fourth signal from the first device in response to the second signal, wherein the fourth signal corresponds to a second training sequence. A control module is configured to determine whether the second device is experiencing crosstalk based on a determination of whether the second device transmitted the second signal.

A method of operating a first device includes beginning transmission of a first signal, over a communication link, to a second device, and, in response to receiving a second signal over the communication link during the transmission of the first signal to the second device, determining whether the second signal corresponds to crosstalk by suspending the transmission of the first signal to the second device. The determining whether the second signal corresponds to crosstalk includes, in response to continuing to receive the second signal subsequent to the suspending the transmission of the first signal to the second device, determining that the second signal does not correspond to crosstalk, and, in response to not continuing to receive the second signal subsequent to suspending the transmission of the first signal to the second device, determining that the second signal does correspond to crosstalk.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

A host and/or a device (e.g., link partners) communicating over a universal serial bus (USB) connection may experience crosstalk during communication with another device. Crosstalk occurs when a signal transmitted by a device (e.g., the host) on a transmit channel causes signal activity on a receive channel. For example, in USB 3.0 communication (e.g., between a USB3 host and a USB3 device), crosstalk may occur when a signal transmitted over a transmit differential signal pair is detectable on a receive differential signal pair. A transmitting device may interpret the crosstalk detected on the receive differential signal pair as being transmitted from another device.

A USB crosstalk management system according to principles of the present disclosure is configured to determine whether one or both of the links partners is susceptible to, or is experiencing, crosstalk. For example, the USB crosstalk management system may determine which of the link partners is experiencing the crosstalk (i.e., which of the link partners is subject to interference due to crosstalk—e.g., a "crosstalk victim"). The host may determine whether the device is a crosstalk victim, and/or whether the host itself is a crosstalk victim. Conversely, the device may determine whether the host is a crosstalk victim, and/or whether the device itself is a crosstalk victim. If one or both of the link partners is experiencing crosstalk, the system may adjust operating parameters of one or both of the link partners such that the crosstalk is distinguishable from the transmitted signal. For example, if one or both of the link partners is experiencing crosstalk, then respective transmission frequencies of each of the link partners may be adjusted.

Figure 1A:
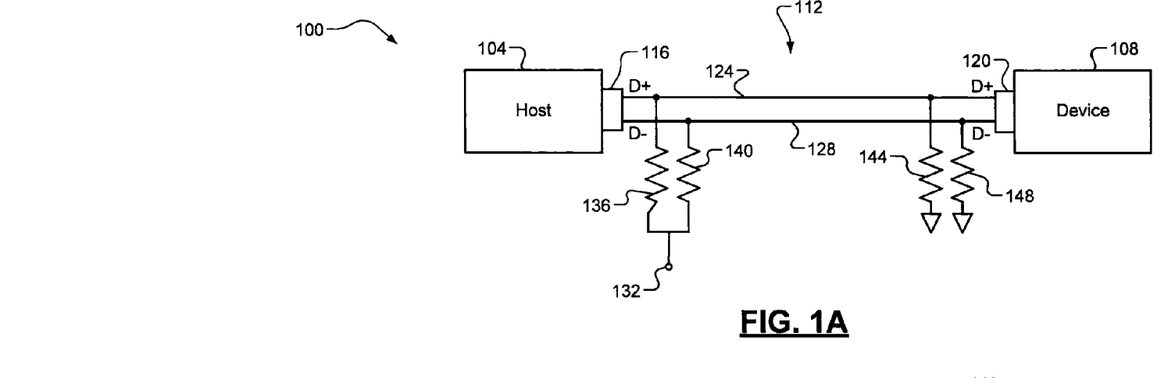
FIG. 1A is a functional block diagram of a universal serial bus (USB) communication system according to the present disclosure.
Figure 1B:
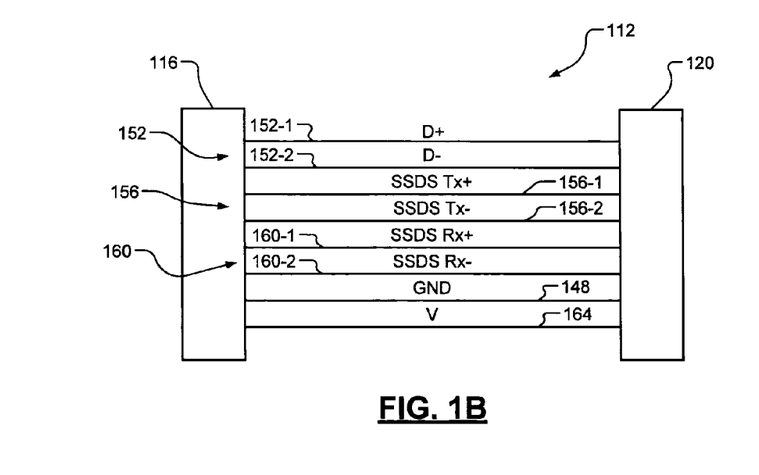
FIG. 1B illustrates a USB cable according to the present disclosure.

Referring now to FIGS. 1A and 1B, a USB communication system 100 includes a host 104 and a device 108 that communicate as link partners. For example only, the host 104 includes, but is not limited to, a desktop computer, laptop, set top box, smartphone or other mobile device, or any other suitable host device. The device 108 includes, but is not limited to, a camera, printer, solid state drive, or any other suitable peripheral or mobile device. The host 104 and the device 108 communicate according to USB protocol over a USB cable 112. The USB cable 112 is connected to the host 104 and the device 108 via respective connectors 116 and 120.

For example only, the cable 112 may include one or more differential signal pairs including a D+ signal line 124 and a D− signal line 128. At a host (e.g., transmitter) side, each of the signal lines 124 and 128 is connected to a common voltage 132 via respective resistors 136 and 140. Conversely, at a device (e.g., receiver) side, each of the signal lines 124 and 128 is connected to ground via respective resistors 144 and 148. The host 104 may monitor voltages across the resistors 136 and 140 to determine whether a load (e.g., the device 108) is connected to the host 104.

Referring now to FIG. 1B, the cable 112 includes a plurality of signal lines including, but not limited to, ground (GND) 148, a differential signal pair 152 (including signal lines 152-1 and 152-2), a super speed differential signal (SSDS) transmit pair 156 (including signal lines 156-1 and 156-2), an SSDS receive pair 160 (including signal lines 160-1 and 160-2), and a voltage line (e.g., a voltage bus) 164. The differential signal pair 152 is used to both transmit and receive according to a USB 2.0 communication protocol. Conversely, the SSDS transmit pair 156 and the SSDS receive pair 160 are used to transmit and receive, respectively, according to USB 3.0 protocol.

The SSDS transmit pair 156 and the SSDS receive pair 160 operate in a normal (awake) mode at, for example, 5 gigabits per second (Gbps) at 2.5 GHz. In the normal mode, the host 104 and the device 108 transmit and receive super speed differential data signals. In a power saving (i.e., sleep) mode, the host 104 and the device 108 may be configured to transmit and receive low frequency periodic signaling (LFPS) signals at lower speeds and frequencies (e.g., from 50 Hz to 10 MHz). Transmitting and receiving the LFPS signals consumes less power than transmitting and receiving the SSDS signals.

Accordingly, when in the sleep mode, the host 104 and the device 108 may attempt to communicate using the LFPS signals. For example, if the host 104 is in the normal mode and the device 108 is in the sleep mode, the host 104 may send an LFPS wakeup signal to the device 108. If the host 104 receives an LFPS reply (e.g., acknowledgement) signal from the device 108, then the host 104 determines that the device 108 successfully received the LFPS wakeup signal and is now operating in the normal mode. In other words, the LFPS reply signal indicates that the device 108 received the LFPS wakeup signal and transitioned from the sleep mode to the normal mode in response to the LFPS wakeup signal. When both the host 104 and the device 108 are operating in the normal mode, the host 104 and the device 108 may then exchange training sequences and/or configuration information (e.g., to train respective transceivers of the host 104 and the device 108) to continue communication according to the USB 3.0 protocol.

In some circumstances, the host 104 detects crosstalk on the SSDS receive pair 160 caused by the LFPS signals transmitted on the SSDS transmit pair 156 (or, the device 108 may detect crosstalk caused by signals transmitted by the device 108). The crosstalk may appear to the host 104 as the LFPS reply signal transmitted by the device 108. In other words, the host 104 may detect an LFPS reply signal that is actually crosstalk caused by the LFPS wakeup signal, and the device 108 is not actually awake and operating in the normal mode. Accordingly, the host 104 proceeds to attempt to exchange the training sequences and/or configuration information with a device 108 that is in the sleep mode.

The host 104 and/or the device 108 according to the present disclosure implement a USB crosstalk management system that determines whether one or both of the links partners is susceptible to, or is experiencing, crosstalk (i.e., is subject to interference due to crosstalk), and may adjust operating parameters of one or both of the link partners such that the crosstalk is distinguishable from the transmitted signal. Accordingly, the USB crosstalk management system includes both crosstalk detection and crosstalk management.

For example, in one implementation, the host 104 transmits the LFPS wakeup signal to the device 108 and receives the LFPS reply signal. The LFPS reply signal may be caused by crosstalk from the LFPS wakeup signal, or may be transmitted from the device 108. In response to the LFPS reply signal, the host 104 begins to transmit a first training sequence, and receives a signal corresponding to the first training sequence. The received first training sequence may be caused by crosstalk from the first training sequence transmitted by the host 104, or may be transmitted from the device 108. In response to receiving the first training sequence, the host 104 suspends transmission of the first training sequence. If the host 104 does not continue receiving the first training sequence after having suspended transmission of the first training sequence, then the host 104 may determine that the received first training sequence was actually caused by crosstalk and does not correspond to a signal transmitted by the device 108 (e.g., the device 108 may still be in the sleep mode). Accordingly, in such a case, the host 104 determines that the host 104 is subject to interference due to crosstalk. Conversely, if the host 104 continues to receive the first training sequence after having suspended transmission of the first training sequence, then the host 104 may determine that the received first training sequence corresponds to a signal being transmitted by the device 108, and that the host 104 is not subject to interference due to crosstalk. The device 108 may operate in a similar manner to determine whether the device 108 (i.e., itself) is subject to interference due to crosstalk.

In another implementation, the host 104 does not transmit a first training sequence after receiving an LFPS reply signal.

Instead, when the host 104 receives the LFPS reply signal, the host 104 suspends transmission of the LFPS wakeup signal and waits to receive a signal corresponding to a first training sequence from the device 108. If the host 104 receives the first training sequence from the device 108 after having suspended transmission of the LFPS wakeup signal, then the host 104 can determine that the device 108 is awake and the first training sequence corresponds to a signal transmitted from the device 108. In such a case, the host 104 is not subject to interference due to crosstalk. Conversely, if the host 104 does not detect the first training sequence from the device 108 after having suspended transmission of the LFPS wakeup signal, the host 104 can determine that the device 108 is in the sleep mode and the first training sequence received by the host 104 was caused by crosstalk. In such a case, the host 104 can determine that the host 104 is subject to interference due to crosstalk.

Or, one of the link partners (e.g., the device 108) may receive the LFPS wakeup signal, transition from the sleep mode to the normal operating mode, and then not transmit the LFPS reply signal. If the other link partner (e.g., the host 104) continues to send the LFPS wakeup signal (i.e., continues to attempt to wake up the device 108), then the device 108 can determine that the host 104 did not detect an LFPS reply signal caused by crosstalk, and is therefore not subject to interference due to crosstalk. Conversely, if the host 104 suspends transmission of the LFPS wakeup signal and begins to transmit other signals (e.g., the first training sequence), then the device 108 determines that the host 104 detected an LFPS reply signal caused by crosstalk. Accordingly, the device 108 can determine that the host 104 is subject to interference caused by crosstalk.

Figure 2:
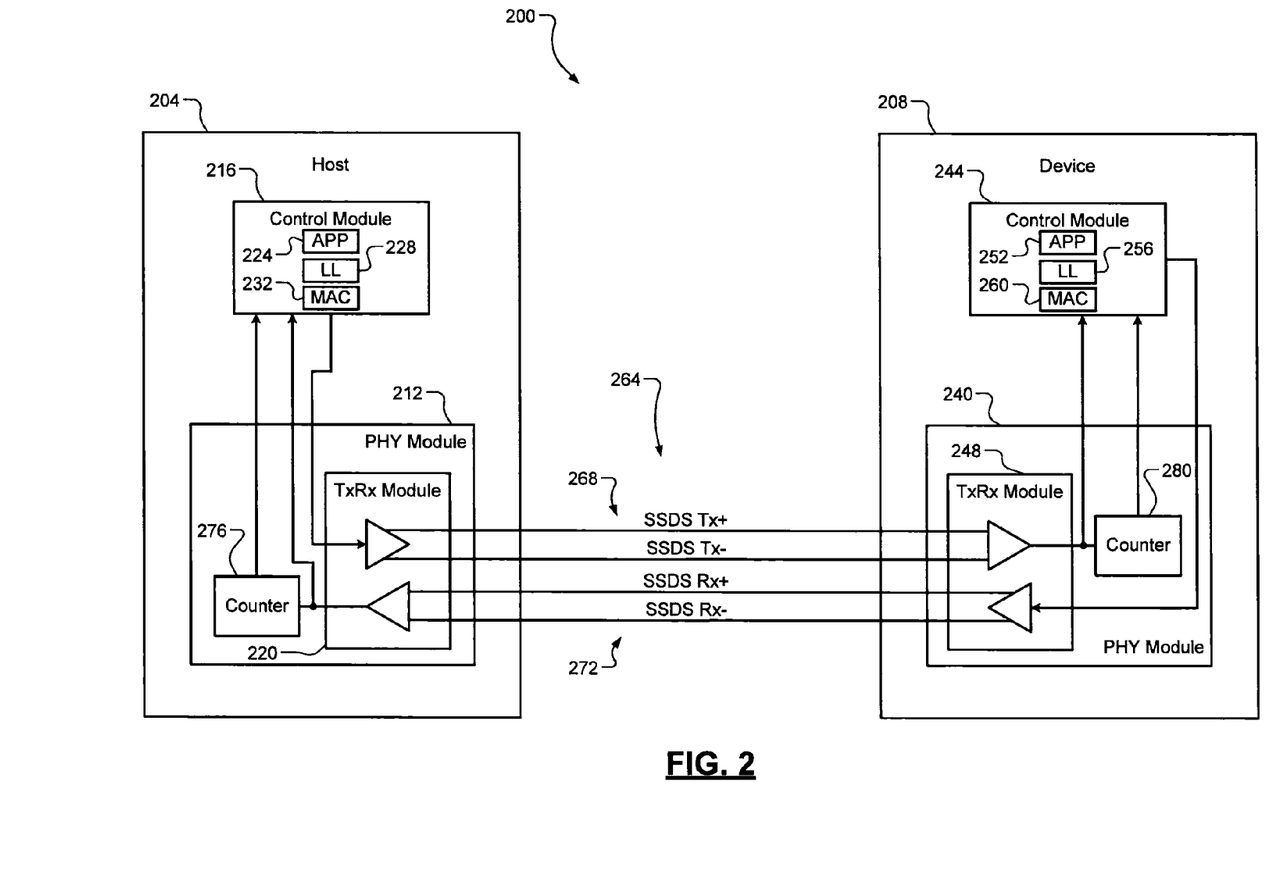
FIG. 2 is a functional block diagram of a crosstalk management system according to the present disclosure.

Referring now to FIG. 2, a crosstalk management system 200 includes a host 204 and a device 208. The host 204 includes a physical layer (PHY) module 212 and a control module 216. The PHY module 212 includes a transceiver module 220. The control module 216 may operate as a link layer controller including one or more device layers including, but not limited to, an application layer (APP) 224, a link layer (LL) 228, and a media access controller (MAC) 232. Similarly, the device 208 includes a PHY module 240 and a control module 244. The PHY module 240 includes a transceiver module 248. The control module 244 may operate as a link layer controller including an application layer (APP) 252, a link layer (LL) 256, and a media access controller (MAC) 260. The host 204 and the device 208 communicate via a USB cable 264 including an SSDS transmit pair 268 and an SSDS receive pair 272. For illustration simplicity, additional signal lines as described in FIGS. 1A and 1B are not shown.

The respective PHY modules 212 and 240 and control modules 216 and 244 may implement the crosstalk management system 200 according to the principles of the present disclosure. For example, in the host 204, the PHY module 212 and the control module 216 control transmission and detection of the LFPS wakeup and reply signals, as well as training, configuration, and data signals. Conversely, in the device 208, the PHY module 240 and the control module 244 control transmission and detection of the LFPS wakeup and reply signals, as well as training, configuration, and data signals. Further, the respective control modules 216 and 244 may store data indicating whether the host 204 and/or the device 208 is subject to interference caused by crosstalk. For example, if the host 204 determines that the host 204 or the device 208 is subject to interference caused by crosstalk, then the control module 216 may store data (e.g., a crosstalk status data) indicating that the host 204 or the device 208 is subject to interference caused by crosstalk. Similarly, the control module 244 may store data indicating that the host 204 or the device 208 is subject to interference caused by crosstalk. Further, the link partners (i.e., the host 204 and the device 208) may exchange the crosstalk status data so each link partner is aware of which of the host 204 and the device 208 is subject to interference caused by crosstalk.

When each of the host 204 and the device 208 has access to the crosstalk status data from previous crosstalk detection, the host 204 and the device 208 do not need to repeat crosstalk detection. For example, if the host 204 and the device 208 previously performed crosstalk detection to identify which of the host 204 and the device 208 is subject to interference caused by crosstalk as described with respect to FIGS. 1A and 1B, and stored the crosstalk status data, then the host 204 and the device 208 are each already aware of which of the link partners is subject to interference caused by crosstalk. Conversely, if the host 204 and the device 208 have just been connected to one another and powered on and the crosstalk detection has not been performed, then the host 204 and the device 208 may perform the crosstalk detection.

If neither of the host 204 and the device 208 is subject to interference caused by crosstalk, then the host 204 and the device 208 can proceed to normal operation and communication via the USB cable 264. Conversely, if one or both of the host 204 and the device 208 is a crosstalk victim, then the crosstalk management system 200 may adjust operating parameters of one or both of the link partners such that the crosstalk is distinguishable from transmitted signals. For example, each of the host 204 and the device 208 are configured to transmit the LFPS signals (i.e., the LFPS wakeup signal and the LFPS reply signal) at various frequencies. For example only, the frequencies may range between 50 Hz and 10 MHz. If both of the link partners are transmitting at the same frequency, then crosstalk from one of the link partners may be indistinguishable from signals transmitted by the other of the link partners. Accordingly, if one of the link partners is subject to interference caused by crosstalk, one of the link partners may initiate a crosstalk management procedure in which one or both of the host 204 and the device 208 adjusts a transmission frequency.

In one implementation, each of the host 204 and the device 208 adjusts a respective transmission frequency if one of the host 204 and the device 208 is subject to interference caused by crosstalk. For example, one of the host 204 and the device 208 may be configured to automatically increase its transmission frequency while the other of the host 204 and the device 208 is configured to automatically decrease its transmission frequency in response to a determination that one or both of the link partners is subject to interference caused by crosstalk. For example only, an upstream device (e.g., the host 204) may increase its transmission frequency while a downstream device (e.g., the device 208) may decrease its transmission frequency. In other words, each of the link partners can be configured to automatically increase its transmission frequency if the link partner is the upstream device, and to automatically decrease its transmission frequency if the link partner is the downstream device. In other implementations, only one of the link partners may adjust its transmission frequency.

Accordingly, when the respective transmission frequencies of the host 204 and the device 208 are different, then any crosstalk from one of the link partners is distinguishable from signals transmitted from the other of the link partners. When the transmission frequencies of the host 204 and the device 208 are different, any signals received by, for example, the host 204 on the SSDS receive pair 272 having the same transmission frequency as the host 204 can be identified as crosstalk. Conversely, any signals received by the host 204 on the SSDS receive pair 272 having a different transmission frequency than the host 204 can be identified as signals transmitted by the device 208.

The host 204 (or the device 208) may determine, and store data indicative of (i.e., transmission frequency data) the transmission frequency of the device 208 (or the host 204). For example only, the PHY module 212 includes a frequency counter (e.g., a closed loop counter) 276 that determines a frequency of signals received on the SSDS receive pair 272, which corresponds to a transmission frequency of the device 208. Conversely, the PHY module 240 may include a frequency counter 280 that determines a frequency of signals received on the SSDS transmit pair 268, which corresponds to a transmission frequency of the host 204. Accordingly, either of the host 204 and the device 208 (i.e., using the control module 216 and the control module 244, respectively) may adjust its transmission frequency to be different from the transmission frequency of the other of the host 204 and the device 208.

In other implementations, the host 204 (or the device 208) may adjust sleep mode operating parameters in response to a determination that the other of the device 208 (or the host 204) is subject to interference caused by crosstalk. For example, if the host 204 determines that the device 208 is subject to interference caused by crosstalk, the host 204 adjusts its own sleep mode operating parameters. In the sleep mode, various components of the host 204 operate at reduced power and/or frequency levels. Accordingly, the components require a longer period of time to wake up in response to a received signal. However, when the link partner is subject to interference caused by crosstalk, the host 204 adjusts the sleep mode operating parameters such that one or more components associated with receiving signals (e.g., the PHY module 212) operate according to normal mode power and/or frequency levels. In this manner, even if the link partner proceeds to transmit other signals without waiting for a reply to the LFPS wakeup signal, the host 204 may still wake up soon enough to receive the other signals.

In another implementation, the host 204 (or the device 208) may adjust LFPS transmission parameters in response to a determination that the host 204 (or the device 208) is subject to interference caused by crosstalk. For example, if the host 204 determines that the host 204 is subject to interference caused by crosstalk, the host 204 increases a transmission period of the LFPS wakeup signal (e.g., to a maximum LFPS signal time). In this manner, the host 204 may increase a likelihood that the device 208 receives the LFPS wakeup signal and is awake before the host 204 begins to transmit other signals.

Figure 3:
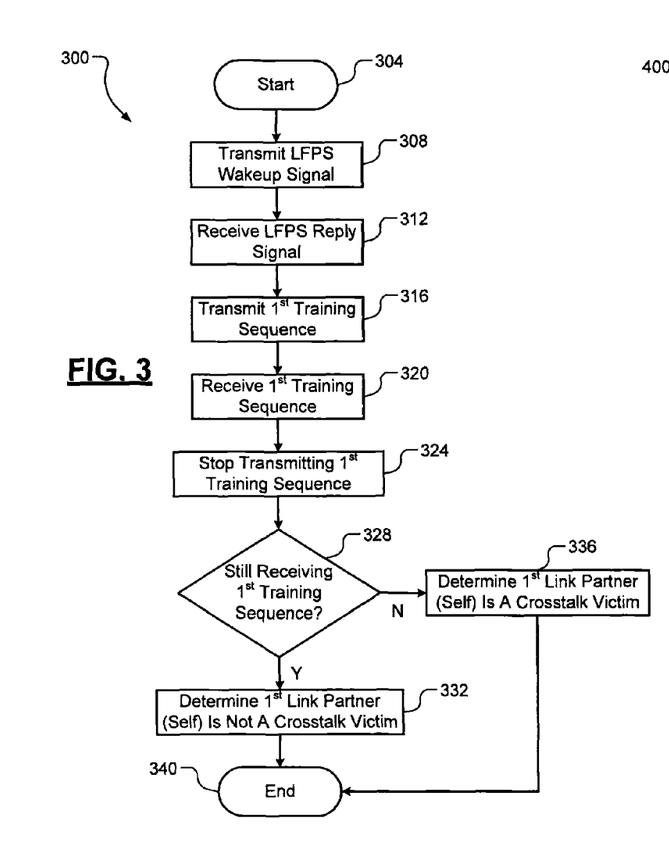
FIG. 3 illustrates a first crosstalk detection method according to the present disclosure.

Referring now to FIG. 3, a first method 300 for detecting whether a device is subject to interference due to crosstalk begins at 304. At 308, a first link partner (e.g., a host) transmits an LFPS wakeup signal to a second link partner (e.g., a device). At 312, the first link partner receives an LFPS reply signal (i.e., an acknowledgement). At 316, the first link partner transmits a first training sequence. At 320, the first link partner receives a signal corresponding to the first training sequence. At 324, the first link partner suspends transmission of the first training sequence. At 328, the first link partner determines whether the first link partner is still receiving the first training sequence. If true, the method 300 continues to 332. If false, the method 300 continues to 336. At 332, the method 300 determines that the first training sequence is not being caused by crosstalk, and that the first link partner is not subject to interference caused by crosstalk. In other words, the first link partner determines itself is not subject to interference caused by crosstalk. At 336, the method 300 determines that the first training sequence was caused by crosstalk, and that the first link partner is subject to interference caused by crosstalk. In other words, the first link partner determines that the first link partner is subject to interference caused by crosstalk. The method 300 ends at 340.

Figure 4:
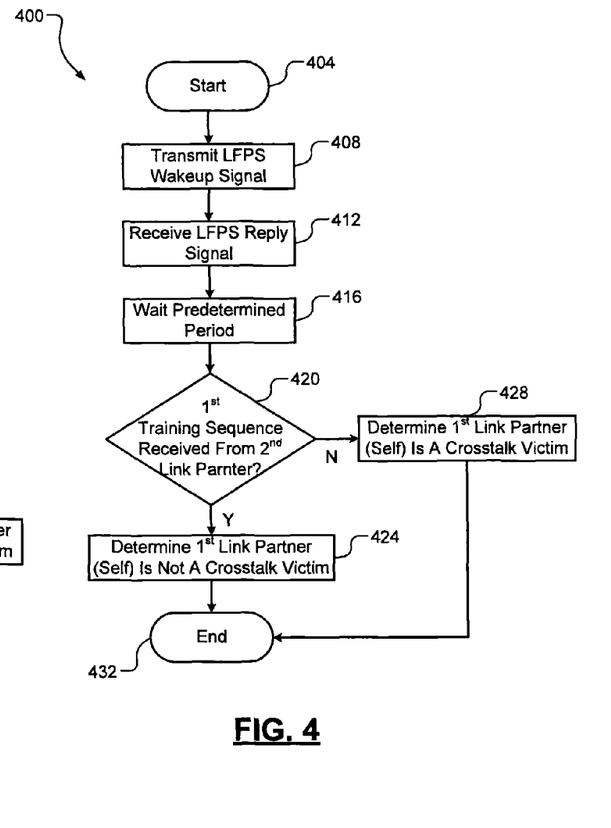
FIG. 4 illustrates a second crosstalk detection method according to the present disclosure.

Referring now to FIG. 4, a second crosstalk detection method 400 begins at 404. At 408, a first link partner (e.g., a host) transmits an LFPS wakeup signal to a second link partner (e.g., a device). At 412, the first link partner receives an LFPS reply signal (i.e., an acknowledgement). At 416, the first link partner waits for a predetermined period without transmitting a first training sequence. At 420, the first link partner determines whether the second link partner transmitted a signal corresponding to the first training sequence during the predetermined period. If true, the method 400 continues to 424. If false, the method 400 continues to 428. At 424, the method 400 determines that the LFPS reply signal was not caused by crosstalk, and that the first link partner is not subject to interference caused by crosstalk. In other words, the first link partner determines that the first link partner is not subject to interference caused by crosstalk. At 428, the method 400 determines that the LFPS reply signal was caused by crosstalk, and that the first link partner is subject to interference caused by crosstalk. In other words, the first link partner determines that the first link partner is subject to interference caused by crosstalk. The method 400 ends at 432.

Figure 5:
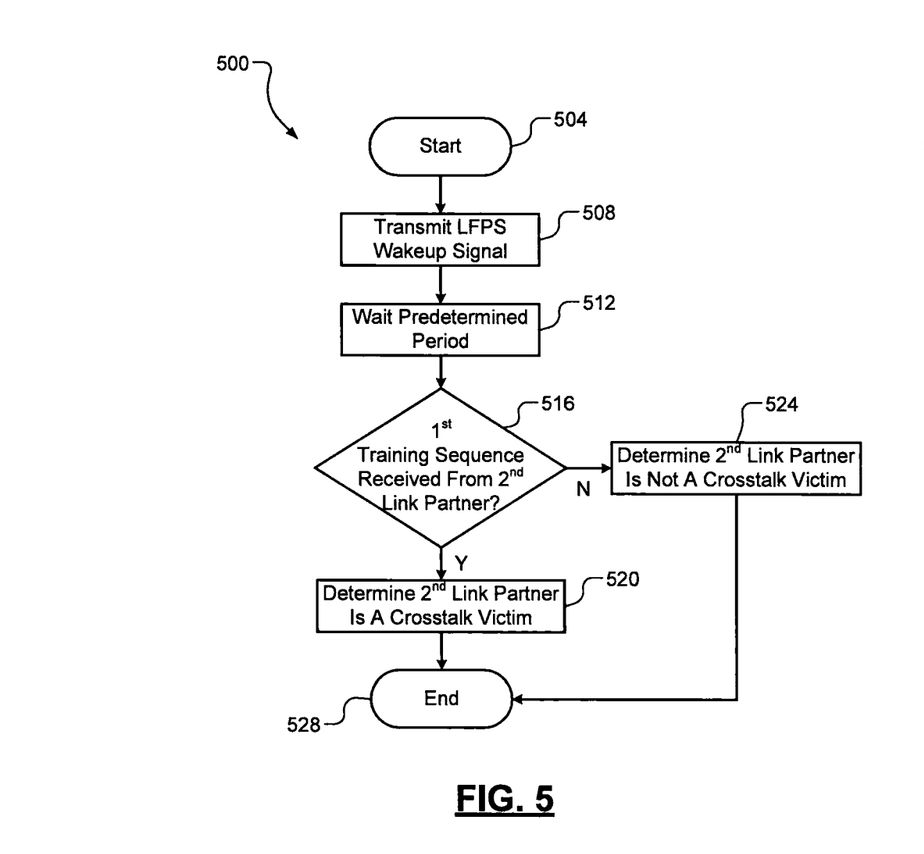
FIG. 5 illustrates a third crosstalk detection method according to the present disclosure.

Referring now to FIG. 5, a third crosstalk detection method 500 begins at 504. At 508, a second link partner (e.g., a device) receives an LFPS wakeup signal from a first link partner (e.g., a host). At 512, the second link partner waits for a predetermined period without transmitting an LFPS reply signal. At 516, the second link partner determines whether a signal corresponding to a first training sequence was received from the first link partner during the predetermined period. If true, the method 500 continues to 520. If false, the method 500 continues to 524. At 520, the method 500 determines that the first link partner detected an LFPS reply signal caused by crosstalk, and that the first link partner is subject to interference caused by crosstalk. In other words, the second link partner determines that the first link partner is a crosstalk victim. At 524, the method 500 determines that the first link partner did not detect an LFPS reply signal caused by crosstalk, and the first link partner is not subject to interference caused by crosstalk. In other words, the second link partner determines that the first link partner is not subject to interference caused by crosstalk. The method 500 ends at 528.

Figure 6:
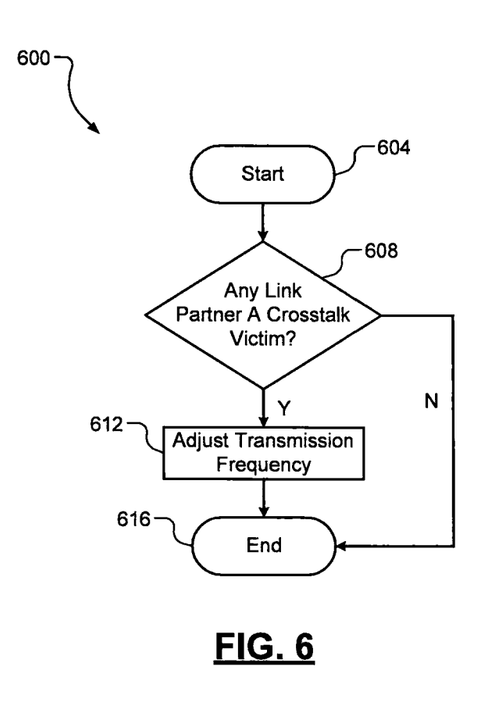
FIG. 6 illustrates a crosstalk management method according to the present disclosure.

Referring now to FIG. 6, a crosstalk management method 600 begins at 604. At 608, the method 600 determines whether either of a first link partner (e.g., a host) and a second link partner (e.g., a device) is subject to interference caused by crosstalk. If true, the method 600 continues to 612. If false, the method 600 ends at 616. At 612, the method 600 adjusts a transmission frequency of the first link partner and/or a transmission frequency of the second link partner. For example only, the method 600 increases the transmission frequency of an upstream one of the link partners and decreases the transmission frequency of a downstream one of the link partners. The method ends at 616.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A first device, comprising:
   a transceiver module configured to begin transmission of a first signal, over a communication link, to a second device; and
   a control module configured to, in response to the transceiver module receiving a second signal over the communication link during the transmission of the first signal to the second device, determine whether the second signal corresponds to crosstalk by having the transceiver module suspend the transmission of the first signal to the second device, wherein
      in response to the transceiver module continuing to receive the second signal subsequent to the transceiver module having suspended the transmission of the first signal to the second device, the control module determines that the second signal does not correspond to crosstalk, and
      in response to the transceiver module not continuing to receive the second signal subsequent to the transceiver module having suspended the transmission of the first signal to the second device, the control module determines that the second signal does correspond to crosstalk.

2. The first device of claim 1, wherein the first signal and the second signal correspond to a first training sequence.

3. The first device of claim 2, wherein the transceiver module is configured to, prior to transmission of the first signal, i) transmit a third signal to the second device, ii) receive a fourth signal from the second device, and iii) begin the transmission of the first signal to the second device in response to receiving the fourth signal.

4. The first device of claim 3, wherein the third signal corresponds to a low frequency periodic signaling wakeup signal and the fourth signal corresponds to a low frequency periodic signaling wakeup signal.

5. The first device of claim 1, wherein the control module is configured to store crosstalk status data indicative of whether the first device is experiencing crosstalk.

6. The first device of claim 1, wherein the control module is configured to adjust a transmission frequency of the transceiver module if the first device is experiencing crosstalk.

7. A first device, comprising:
   a transceiver module configured to i) receive a first signal and a second signal transmitted from a second device to the first device, wherein the first signal corresponds to a wakeup signal and the second signal corresponds to a first training sequence, ii) transmit a third signal from the first device in response to the first signal, wherein the third signal corresponds to a reply to the wakeup signal, and iii) transmit a fourth signal from the first device in response to the second signal, wherein the fourth signal corresponds to a second training sequence; and
   a control module configured to determine whether the second device is experiencing crosstalk based on a determination of whether the second device transmitted the second signal.

8. The first device of claim 7, wherein the transceiver module is configured to i) receive the first signal, and ii) wait a predetermined period without transmitting the third signal after receiving the first signal, and wherein the control module is configured to determine whether the second device transmitted the second signal during the predetermined period.

9. The first device of claim 8, wherein the control module is configured to determine that the second device is experiencing crosstalk if the second device transmitted the second signal during the predetermined period.

10. The first device of claim 7, wherein the control module is configured to store crosstalk status data indicative of whether the second device is experiencing crosstalk.

11. The first device of claim 7, wherein the control module is configured to adjust a transmission frequency of the transceiver module if the second device is experiencing crosstalk.

12. A method of operating a first device, the method comprising:
   beginning transmission of a first signal, over a communication link, to a second device; and
   in response to receiving a second signal over the communication link during the transmission of the first signal to the second device, determining whether the second signal corresponds to crosstalk by suspending the transmission of the first signal to the second device, wherein the determining whether the second signal corresponds to crosstalk includes:
      in response to continuing to receive the second signal subsequent to the suspending the transmission of the first signal to the second device, determining that the second signal does not correspond to crosstalk, and
      in response to not continuing to receive the second signal subsequent to suspending the transmission of the first signal to the second device, determining that the second signal does correspond to crosstalk.

13. The method of claim 12, wherein the first signal and the second signal correspond to a first training sequence.

14. The method of claim 13, further comprising, prior to transmission of the first signal:
- transmitting a third signal to the second device;
- receiving a fourth signal from the second device; and
- beginning the transmission of the first signal to the second device in response to receiving the fourth signal.

15. The method of claim 14, wherein the third signal corresponds to a low frequency periodic signaling wakeup signal and the fourth signal corresponds to a low frequency periodic signaling wakeup signal.

16. The method of claim 12, further comprising storing crosstalk status data indicative of whether the first device is experiencing crosstalk.

17. The method of claim 12, further comprising adjusting a transmission frequency associated with the first device if the first device is experiencing crosstalk.

* * * * *